Figure 3:
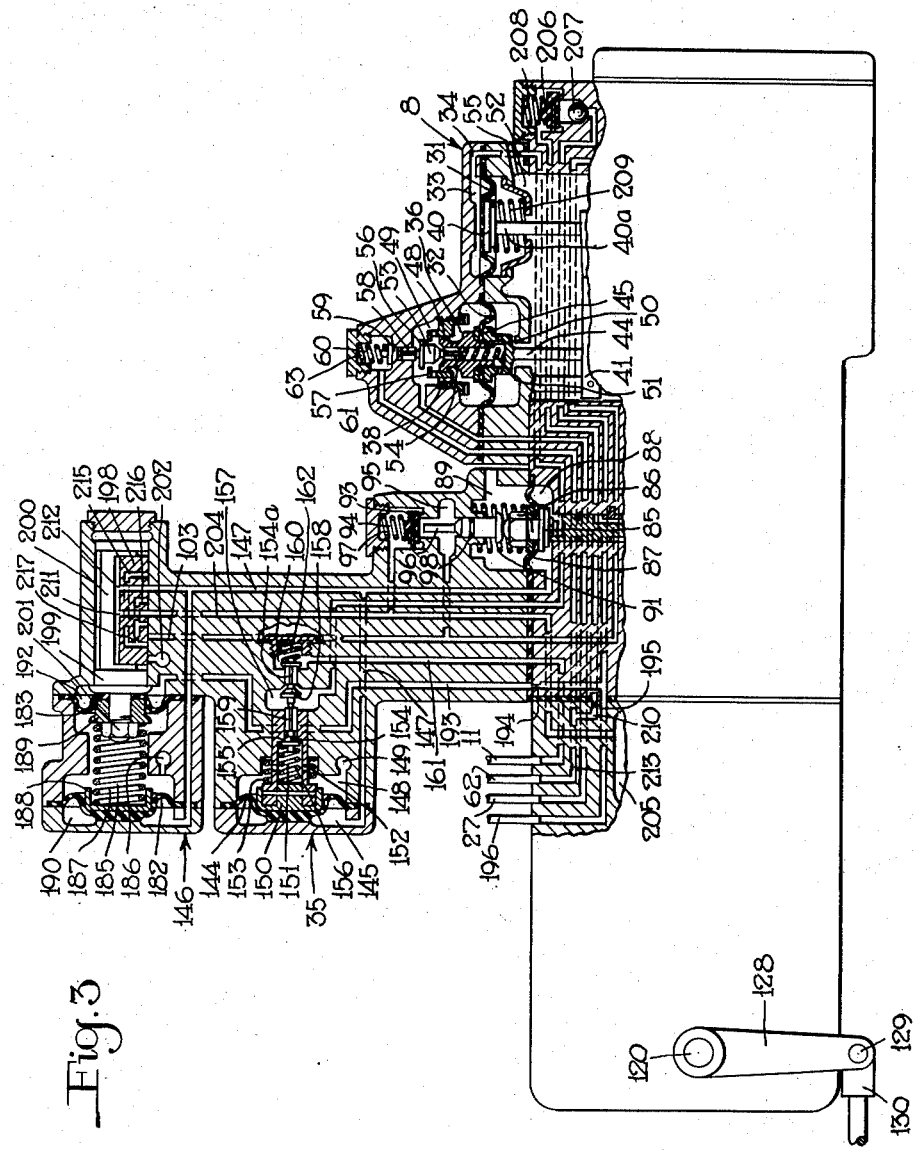

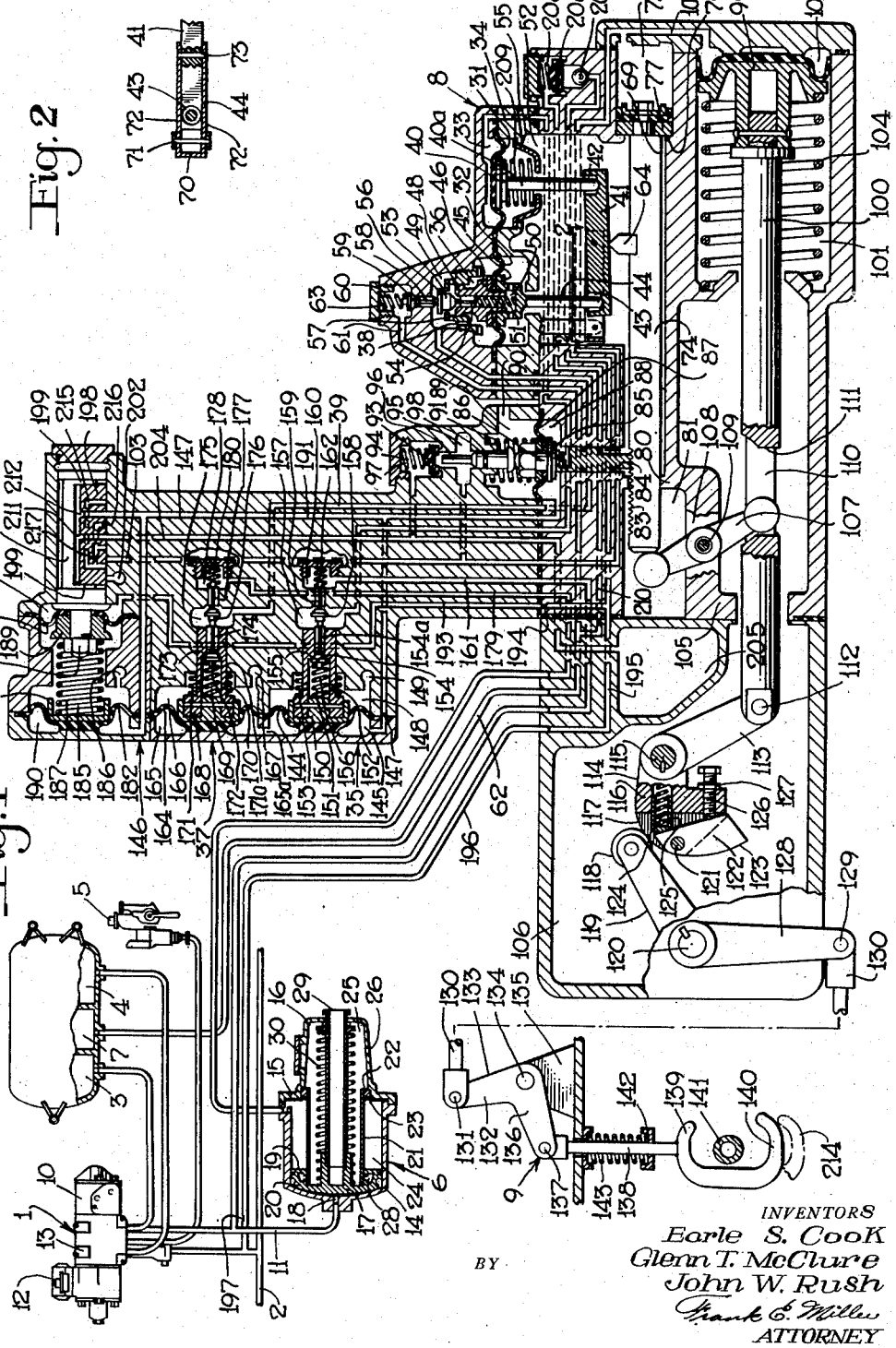

Nov. 20, 1951  E. S. COOK ET AL  2,575,943
LOAD COMPENSATING BRAKE EQUIPMENT
Filed Jan. 25, 1950  2 SHEETS—SHEET 2

INVENTORS
*Earle S. Cook*
*Glenn T. McClure*
BY *John W. Rush*

*Frank C. Miller*
ATTORNEY

Patented Nov. 20, 1951

2,575,943

UNITED STATES PATENT OFFICE 2,575,943

LOAD COMPENSATING BRAKE EQUIPMENT

Earle S. Cook, Forest Hills, Glenn T. McClure, McKeesport, and John W. Rush, Wilkinsburg, Pa., assignors to Westinghouse Air Brake Company, a corporation of Pennsylvania Application January 25, 1950, Serial No. 140,426

20 Claims. (Cl. 303—22)

This invention relates to variable load brake equipment and more particularly to the type adapted to be automatically adjusted to vary the degree of braking of a vehicle in accordance with the loaded condition thereof.

The present trend toward the use of light weight materials in the construction of railway freight cars has resulted in much higher ratios of gross to tare weight than ever before encountered. A brake design to provide desired deceleration and stopping of an empty car of this type is therefore wholly inadequate for the car when loaded, and conversely, a brake designed to provide desired deceleration and stopping of the loaded car could not be tolerated on the empty car since it might result in excessive and damaging train shock and cause undesired sliding of the car wheels.

The principal object of the invention is therefore the provision of an improved variable load brake equipment adapted to automatically vary the degree of braking of a car in accordance with the load condition thereof.

According to this object we employ a single brake cylinder device for braking the car, the piston therein having the usual pressure chamber at the front side thereof and a second pressure chamber at the opposite side. The well-known AB valve is used for varying the pressure of fluid in the usual pressure chamber at the front of the brake cylinder piston, and a novel relay valve device embodying a scale beam having a fulcrum automatically adjustable according to the empty or loaded condition of the car, is arranged to operate upon supply of fluid under pressure to the usual pressure chamber to vary pressure of fluid in the second chamber, from atmospheric pressure for a fully loaded car, inversely in proportion to the degree of the load, for thereby varying the effect of the pressure of fluid on the front of the piston to apply the brakes, as a result of which, the degree of braking of the car will be varied in proportion to the degree of the load carried thereby. In other words, when the car is fully loaded, the pressure in the second chamber will be atmospheric pressure so that the degree of the brake application of the car will be governed solely by the pressure of fluid in the pressure chamber in the front of the brake cylinder piston in the usual manner. When the car is less than fully loaded the degree of braking will be governed by the differential in pressure acting on opposite sides of the brake cylinder piston, and this differential will be of minimum degree when the car is empty and will be increased in proportion to the degree of load on the car until it disappears on the fully loaded car.

Another object is to provide novel means in a brake equipment of the above described type for relieving the scale beam above mentioned, of force pressing it against its fulcrum prior to adjusting of said fulcrum relative to said scale beam.

Other objects and advantages will become apparent from the following more detailed description of the invention.

In the accompanying drawings, Fig. 1 is a diagrammatic view, partly in outline and partly in section, of a variable load brake equipment embodying the invention; Fig. 2 is a sectional view taken on the line 2—2 in Fig. 1; and Fig. 3 is a diagrammatic view of a modification of a part of the equipment shown in Fig. 1.

Description—Fig. 1

As shown in Fig. 1 of the drawings, the variable load brake equipment comprises a brake controlling valve device 1 to which is connected the usual brake pipe 2, auxiliary reservoir 3, emergency reservoir 4 and a brake cylinder pressure retaining valve device 5, as well as a brake cylinder device 6. The equipment further comprises a load reservoir 7, a load compensating or variable leverage relay valve device 8 and a weighing gear or adjusting mechanism 9 associated with said compensating device. The auxiliary, emergency and load reservoirs are preferably provided in a common casing separated by dividing walls as shown in the drawing. All the above enumerated structure is adapted to be carried by a sprung part of the car such as by the bottom of the floor thereof.

The brake controlling valve device 1 may be of substantially the same construction and have the same operating characteristics as the AB valve device fully described in the patent issued to Clyde C. Farmer, No. 2,031,213 on February 18, 1936, in view of which it is not deemed necessary to show and describe this device in detail. Briefly, however, the brake controlling valve device 1 comprises a service portion 10 adapted to operate upon a service and emergency reduction in pressure of fluid in the brake pipe 2 for supplying fluid under pressure from auxiliary reservoir 3 to a brake cylinder pipe 11 and thence to brake cylinder device 6 for, upon a service reduction in brake pipe pressure, effecting a service application of brakes on the car. The brake controlling valve device 1 also comprises an emergency portion 12 which is adapted to operate only upon an emergency reduction in pressure of fluid in brake pipe 2 for supplying fluid under pressure from the emergency reservoir 4 to pipe 11 and thence to brake cylinder 6 wherein such pressure, in addition to that provided for the auxiliary reservoir 3 by operation of the service portion 10, is adapted to operate the brake cylinder device for effecting an emergency application of the brakes on the car. The service and emergency portions 10 and 12 of the brake controlling valve device 1 are mounted on opposite faces of a pipe bracket 13 to which all pipe connections to said valve device are made, as shown in the drawing.

The brake cylinder device 6 comprises a hollow cup-shaped casing 14 to the open end of which is secured an annular pressure head 15 from which projects a hollow cup-shaped non-pressure head 16. A brake cylinder piston 17 is slidably mounted in the casing 14 and at one side thereof is the usual or main pressure chamber 18 to which is connected the pipe 11. The brake cylinder piston 17 comprises a piston head 19 to one face of which is connected a flexible packing cup 20 for preventing leakage of fluid under pressure from the pressure chamber 18 to the opposite side of the piston. Secured to and projecting from the piston 17 in a direction away from pressure chamber 18 is a hollow stem 21 the opposite end of which is slidably mounted in a ring 22 secured in the pressure head 15. Carried by the pressure head 15 and ring 22 is a packing cup or ring 23 having sealing or sliding contact with the outer peripheral surface of the stem 21 for preventing leakage of fluid under pressure from a compensating, or balancing, pressure chamber 24 formed around said stem between the pressure head 15 and the piston 17, to a non-pressure chamber 25 formed within said stem and open to the interior of the non-pressure head 16 and thence to atmosphere through a port 26 in said non-pressure head. The chamber 24 is open to a pipe 27 through which fluid under pressure is adapted to be supplied to and released from said chamber by operation of the compensating valve device 8, in a manner which will be hereinafter described.

The piston 19 is provided with a hollow boss 28 projecting into the hollow stem 21 in coaxial relation to said head and stem, and one end of a hollow rod 29 is secured in said boss. The rod 29 extends through the non-pressure chamber 25 and a bore provided in the outer end of the non-pressure head 16 to the exterior thereof, said rod being hollow to accommodate the usual push rod (not shown) for connecting the piston head 17 with the brake rigging (not shown) of the car, in the conventional manner. Encircling the hollow rod is a brake cylinder piston release spring 30, one end of which bears against the piston head 19 for moving the brake cylinder piston 17 to its brake release position, in which it is shown in the drawing. The opposite end of the release spring is supported on the non-pressure head 16.

The load compensating valve device 8 comprises pilot and balancing flexible diaphragms 31 and 32, respectively, preferably of the same area arranged edge to edge in spaced relation with their axes parallel. At one side of pilot diaphragm 31 there is a pressure chamber 33 which is connected through a passage 34 to a brake cylinder cut-off valve device 35. At the side of balancing diaphragm 32 is a chamber 36 which is connected to a compensating cylinder cut-off valve device 37 by way of a choke or restricted passage 38 and a passage 39. Engaging the opposite face of diaphragm 31 is a follower 40 provided on one end of a stem 40a, the opposite end of which engages an equalizing member or beam 41 near one end within a pocket 42. Engaging the opposite end of the beam 41 within a similar pocket 43 is one end of a stem 44. The opposite end of stem 44 is in a form of a follower 45 which is secured to the side of the diaphragm 32 opposite chamber 36 by means of a nut 46 contained in said chamber.

The nut 46 has an extension 48 slidably mounted in a bore in the casing and separating chamber 36 from a chamber 49 which is in communication with passage 39. The nut 46 and extension 48 thereof are provided with an axial bore 50 containing a coil spring 51 and open at one end to a chamber 52 in the casing and provided around the opposite end with a valve seat arranged for engagement by a release valve 53. The valve 53 is contained in chamber 49 and has a fluted stem 54 slidably mounted in bore 50 and operatively engaging the spring 51. Chamber 52 is in constant communication with atmosphere through a passage 55. It will be noted that the diaphragm stems 40, 44 and beam 41 are contained in chamber 52 and that the lower faces of the two diaphragms 31, 32 are both subject to atmospheric pressure in said chamber.

The release valve 53, opposite the fluted stem 54, has an enlarged annular collar 56, one side of which is provided for contact with a combined valve guide and stop element 57 projecting from the casing in the chamber 49, while the opposite side is arranged for engagement by the end of a fluted stem 58 of a coaxially arranged fluid pressure supply valve 59 which is contained in a chamber 60. The chamber 60 is open to a passage 61 leading to a pipe 62 which is connected to the load reservoir 3. A bias spring 63 contained in chamber 60 bears on the supply valve 59 for urging it toward its seat.

The side of the equalizing member or beam 41 opposite that from which the diaphragm follower stems 40 and 44 project is supported on a fulcrum, preferably in the shape of an inverted V-shaped knife edge 64 which is associated with a piston rod 74.

The equalizing member or beam 41 is held against longitudinal movement by a yoke 70 (Fig. 2) pivoted on one end on a pin 71 carried in arms 72 projecting from the casing. The arms of the yoke 70 are disposed at opposite sides of the beam 71 and their ends are pivotally connected to said beam near its center by a pin 73. The fulcrum 64 is adapted to be adjusted relative to the beam 41 longitudinally thereof by the piston rod 74 to provide at its line of contact with the beam a fulcrum therefor, the yoke 70 being effective during such adjustment and at all other times, to prevent longitudinal movement of said beam but to in no way interfere with rocking movement of the beam about its connection with the fulcrum 64, which will be later described.

Connected to one end of the piston rod 74 is a bias piston 77 open at one side to a control or pressure chamber 78, while the opposite side of said piston is open to atmospheric chamber 52. A shoulder 79 in the casing is arranged for contact by piston 77 for limiting movement thereof in the direction of the left hand, movement in the direction of the right hand being limited by contact with the casing. The piston rod 74 projects from the piston 77 through the chamber 52 and a bore in a wall 80 which separates said chamber from a chamber 81 in the casing, the end of said rod opposite said piston being supported by contact with the wall of said bore.

The fulcrum 64 has two extreme positions with respect to the equalizing member or beam 41, one position being defined by contact between piston 77 and shoulder 79, which position will hereinafter be referred to as the empty position, which said fulcrum will occupy when the car is empty. In the other extreme position to be hereinafter referred to as the full-load position, the fulcrum 64 will be substantially below the end of the diaphragm follower stem 40a and the piston 77 will be slightly spaced away from contact with the end wall of chamber 78, and this position will be assumed when the car is fully loaded. For various degrees of car load between empty and full-load the fulcrum 64 will assume a corresponding position between the empty and full-load positions, just mentioned. The automatic adjustment of fulcrum 64 to its different positions will be hereinafter described.

The piston rod 74 is provided with a plurality of teeth 83 along the side toward the beam 41 for engagement by teeth on one end of a latch or locking plunger 84 which is mounted to slide in the casing in a direction at right angles to the length of said rod. The end of the plunger 84 opposite the teeth 83 is in the form of a follower 85 secured by screw-thread means 86 to a latch or plunger control diaphragm 87 which is clamped around its periphery in the casing. At the side of the diaphragm 87 adjacent the follower 85 is a pressure chamber 88 to which fluid under pressure is adapted to be supplied for deflecting said diaphragm in a direction for moving the plunger out of locking engagement with piston rod 74. At the other side is a chamber 89 which is in constant communication with atmosphere through a passage 90. A spring 91 operatively engages a wall in the casing and the screwthread means 86 for urging the plunger 84 to a position in which it is shown in the drawing, in which position said plunger is in locking engagement with the piston rod 74.

A check valve 93 contained in a chamber 94 is provided for closing communication between said chamber and a chamber 95 into which extends a plunger 96 slidably mounted in a bore in the casing in coaxial relation to the diaphragm 87 and abutting screw-thread means 86 so as to be actuated through the medium of said means by the diaphragm 87. With plunger 84 in locking engagement with piston rod 74 the end of plunger 96 is spaced from the check valve 93 a distance slightly exceeding the extent of movement of plunger 87 required to release it from said rod. Upon further movement, the plunger 96 is adapted to engage and unseat valve 93. A spring 97 contained in chamber 94 acts on check valve 93 for urging it to its seat. The ring seal 98 on plunger 96 prevents leakage of fluid under pressure between chambers 94 and 95.

Spaced from and extending generally parallel to the bias piston 77 and its rod 74 is an adjusting piston 99 and a rod 100 projecting from one side of said adjusting piston through a non-pressure chamber 101 which is open to atmospheric chamber 52. At the opposite side of piston 99 is a pressure chamber 102 open to the bias piston pressure chamber 78 by way of passage 103, which passage also connects to chamber 95. A spring 104 contained in the non-pressure chamber 101 and encircling the rod 100 is supported at one end on the casing, while its opposite end bears against piston 99 for urging said piston and rod to a position in which they are shown in the drawing. The end of rod 100 opposite to the piston end extends through an opening in a wall 105 separating chamber 52 from a chamber 106.

A lever 107 extending through an opening 108 in a horizontal portion of the casing wall 80 is fulcrumed therein on a pin 109. The end of this lever in chamber 81 is arranged for contact with the end of the piston rod 74 while the opposite end of said lever is disposed in a slot 110 provided in the adjusting piston rod 100. The slot 110 is of such length as to permit the lever 107 to be free on pin 109 with the adjusting piston 99 in the normal position in which it is shown in the drawing, and to permit a chosen extent of movement of said piston against spring 104 before and when wall 111 of said slot engages the lever.

In chamber 106 the end of the adjusting piston rod 100 is operatively connected by means of a pin 112 to one end of an arm 113 of a bell crank-like lever 114 which at its knee is fulcrumed on a pin 115 secured in the casing. The lever has another arm 116 on the end of which there is provided a fixed cam surface 117 arranged for contact by a roller 118 provided in one end of a lever 119, the opposite end of which is secured to turn with a shaft 120 journaled in the casing. The cam surface 117 is of least radius at the end adjacent the roller 118, as viewed in the drawing. Pivoted by pin 121 to the bell crank arm 116, adjacent the opposite end of the cam surface 117, is an adjustable cam element 122 having a cam surface 123 constituting an extension of the fixed cam surface 130. The cam element 122 is urged to rotate in a counter-clockwise direction about the pin 121 as viewed in the drawing by a spring 124 acting through the medium of a plunger 125 which engages the upper end of said element, this rotation however being limited by an adjusting screw 126 mounted in the lower end of lever arm 116. A lock nut 127 is provided for contact with the lever arm 116 for securing the screw in an adjusted position.

A lever 128 disposed outside of the casing has one end secured to turn with the shaft 120 while connected to its opposite end by a pin 129 is one end of a connecting rod 130. The other end of the rod 130 is connected by a pin 131 to one arm 132 of a bell-crank lever 133 fulcrumed at its knee on a pin 134 carried by a sprung part 135 of the car. The other arm 136 of the bell-crank lever 133 is connected by a pin 137 to the upper end of a rod 138 which has formed integrally therewith at its lower end a C-shaped measuring portion 139 provided with a striking surface 140 for contacting the underside of an unsprung part 141 disposed within said portion in a substantially horizontal position of said surface. The part 141 may be in the form of a rod extending transversely of the car truck or may constitute an axle of a truck wheel and axle assemblage. Interposed between the sprung part 135 and a spring seat 142 mounted on rod 138 is a spring 143 which encircles said rod and constantly urges the rod in a downward direction toward the position in which it is shown in the drawing.

The brake cylinder cut-off valve device 35 comprises a diaphragm 144 clamped at its periphery between two sections of the casing and having at one side a control chamber 145 to which fluid under pressure is adapted to be supplied from a brake pipe cut-off valve portion 146 by way of a branch of a passage 147. At the other side of the diaphragm 144 is a chamber 148 which is in constant communication with atmosphere through passage 149. Contained in the chamber 148 is a follower 150 having an axial bore 151 which is constantly open to chamber 148 by way of ports 152. A spring 153 operatively engages a wall in the casing and said follower for urging said follower toward the position in which it is shown in the drawing. Contained in the bore 151 is an exhaust valve 154 arranged to sealingly engage a valve seat 155 encircling said bore, and also a bias spring 156 which urges the exhaust valve 154 towards its seated position in which it is shown. The valve 154 is provided with a fluted stem 154a by which it is supported in the bore 151 and which extends into a chamber 157 which is connected to the chamber 33 through the passage 34. Contained in the chamber 157 is a supply valve 158 having a fluted stem 159 which extends through a suitable bore in the casing leading to a chamber 160 which is connected to chamber 18 in brake cylinder device 6 through passage 161 and brake cylinder pipe 11. Operatively mounted in chamber 160 is a bias spring 162 for urging valve 159 toward its unseated position in which it is shown in the drawing.

The compensating cylinder cut-off valve device 37 comprises a diaphragm 164 clamped around its periphery between two sections of the casing and having at one side a control chamber 165 in open communication with control chamber 145 through a passage 165a. At the other side of diaphragm 164 is a chamber 166 which is open to atmosphere by way of a vent passage 167. Contained in chamber 166 is a follower 168 which abuts the diaphragm 164 and has an axial bore 169 in communication with said chamber through ports 170. Interposed between and operatively engaging a wall of a casing and the follower 168 is a spring 171 for urging the follower and diaphragm 164 toward the position in which it is shown in the drawing. Contained in the bore 169 is a valve 172 arranged to engage a valve seat 173 which encircles said bore. A bias spring 171a is provided in the bore 169 for urging the valve 172 to its seated position in which it is shown in the drawing. The valve 172 is provided with a fluted stem 174 which extends through bore 169 into a chamber 175 which is open to passage 39 leading to chamber 49. Contained in chamber 175 is a valve 176 having a fluted stem 177 slidably mounted in a suitable bore in the casing and extending into a chamber 178 which is connected to a passage 179 and pipe 27 leading to chamber 24 in the brake cylinder device 6. Interposed between a wall in the casing and the free end of fluted stem 177 is a spring 180 for urging valve 176 out of engagement with valve seat 173 and into abutting engagement with the end of fluted stem 174.

The brake pipe cut-off valve device 146 comprises two coaxially arranged flexible diaphragms 182 and 183 clamped around their edges between two sections of the casing in spaced apart relation to each other. Between the two diaphragms is a chamber 185 which is open to atmosphere through a vent port 186 and which contains a spring 187, the opposite ends of which bear against followers 188 and 189 engaging diaphragms 182 and 183, respectively, for urging said diaphragms apart. At the outer face of diaphragm 182, which is of larger area than diaphragm 183, is a pressure chamber 190 which is connected to the passage 147, which passage is also connected to latch chamber 86. At the opposite face of diaphragm 183 is a valve chamber 192 which is in constant communication with the brake pipe 2 through a passage 193, a choke 194, a passage 195 and thence by way of a pipe 196 in which there is provided a choke 197. In actual practice the pipe 196 is connected directly to pipe bracket 13 of the AB valve device 1 and through said pipe bracket to the well-known brake pipe connection (not shown) therein, and the choke 197 is disposed in said bracket, but for the purpose of simplicity in the present application, the pipe 196 is shown in the drawing connected directly to the brake pipe 2, as above described.

The cut-off valve device 146 further comprises a slide valve 198 contained in chamber 192 and mounted therein between spaced shoulders 199 formed on a stem 200. One end of the stem 200 is connected by follower 189 and a screw-thread means 201 to the center of diaphragm 183 for rendering the slide valve 198 movable by and with said diaphragm.

Connected to the seat of the cut-off slide valve 198 is a passage 202 which leads to atmosphere, a passage 103 which leads to chamber 95 and to the biasing and adjusting piston chambers 78 and 102, and a passage 204 which leads to check valve chamber 94 and to a timing reservoir 205.

The load compensating device 8 further comprises two check valves 206 and 207 arranged in series in a connection between passage 193 and a branch of passage 213 and a bias spring 208 acting on check valve 206 for urging it to its seat.

*Operation—Fig. 1*

Let it be initially assumed that the brake equipment is devoid of fluid under pressure and that to condition the equipment for operation, fluid under pressure is supplied to the brake pipe 2 in the usual manner.

With chamber 145 of the brake cylinder cut-off valve device 35 devoid of fluid under pressure spring 153 will act on follower 150 so as to hold said follower and diaphragm 144 in their extreme left-hand positions in which said diaphragm abuts the casing.

In this position, spring 156 is permitted to seat exhaust valve 154 thus closing communication between chambers 148 and 157, and also spring 162 is permitted to unseat supply valve 158, thus connecting chambers 157 and 160. Likewise, with chamber 165 in the compensating cylinder cut-off valve device 37 devoid of fluid under pressure spring 171 will act on the follower 168 to hold said follower and diaphragm 164 in their extreme left-hand positions in which said diaphragm abuts a portion of the casing. In this position spring 171a is permitted to hold exhaust valve 172 in its seated position and spring 180 is permitted to hold supply valve 176 unseated thereby connecting chambers 175 and 178.

The brake controlling valve device 1 will respond in the usual manner to the pressure of fluid supplied to the brake pipe 2 to charge the auxiliary reservoir 3 and the emergency reservoir 4 with fluid under pressure from said brake pipe, and to at the same time open, if not already open, the brake cylinder pipe 11 and thereby the pressure chamber 18 in the brake cylinder device 6 to atmosphere. With pipe 11 thus open to atmosphere the pilot diaphragm chamber 33 in the load compensating valve device 8 will also be open to atmosphere by way of passage 34, chamber 157 in the brake cylinder cut-off valve device 35, chamber 160, passage 161 and pipe 11, which will permit spring 209 to deflect pilot diaphragm 31 into a position of contact with a portion of the casing, in which these parts are shown in the drawing.

With the pilot diaphragm 31 positioned as just described, any substantial amount of fluid under pressure will act on balancing diaphragm 33 to deflect it downward, the spring 63 will seat the fluid pressure supply valve 59 and the collar 56 on the release valve 53 will be just out of contact with the supply valve stem 58 and in engagement with the stop element 57 which will hold said release valve out of contact with its seat on a nut extension 48. With the release valve 53 thus open chambers 49 and 36, and thereby the compensating pressure chamber 24 in the brake cylinder device 6 connected to chamber 49 by way of pipe 27, passage 179, chambers 180 and 175, and passage 39 will be open to atmosphere by way of chamber 52 and port 55. With both pressure chambers 18 and 24 in the brake cylinder device 6 thus open to atmosphere the brake cylinder piston 17 will assume its brake release position, in which it is shown in the drawing, under the action of the release spring 30.

When fluid under pressure is supplied to the brake pipe 2 for charging the equipment as above mentioned, fluid will also flow therefrom through choke 197 and pipe 196 to passage 195 in the load compensating valve device 8 and thence past the check valves 207 and 206, through a passage 210, and pipe 62 to the load reservoir 7 for charging said reservoir with fluid at the pressure carried in the brake pipe. At the same time fluid supplied from the brake pipe to the load compensating relay valve device 8 will flow from passage 195 through choke 194, passage 193 and passage 179 into valve chamber 192 of the cut-off valve device 146.

The parts of the cut-off valve device 146 will occupy the cut-in position in which they are shown in the drawing until the pressure of fluid in the brake pipe 2 acting in valve chamber 192 is increased to a chosen degree, such as 40 pounds, and during the time required to obtain this pressure, fluid from valve chamber 192 will flow through a port 211 in the slide valve 198 to passage 204 whence it will flow to check valve chamber 94 and to the timing reservoir 205, and at the same time fluid under pressure will also flow from chamber 192 through a port 212 in the slide valve 198 to passage 147 and thence to latch diaphragm chamber 88 and also to chamber 145 in the brake cylinder cut-off valve device 35, whence it will flow through passage 165a to chamber 165 in the compensating cylinder cut-off valve device 37.

When pressure of fluid supplied to chamber 165 in the load compensating cylinder cut-off valve device 37 is increased to a degree, such as 8 pounds, sufficient to overcome the opposing force of spring 171, the diaphragm 164 will deflect inwardly. It will be understood that the strength of spring 171a is of a higher value than that of spring 180. Consequently, the initial inward deflection of diaphragm 164 will cause supply valve 176 to be moved to its seated position first, in which communication between chambers 175 and 178, and therefore between load compensating chamber 24 in the brake cylinder device 6 and chamber 49, is cut off.

Upon an increase in the pressure of fluid supplied to chamber 165 to a predetermined higher degree, such as 10 pounds, sufficient to overcome the additional opposing force of spring 171a, diaphragm 164 will be deflected further inward, causing the valve seat 173 to move away from the exhaust valve 172. With valve 172 unseated any fluid under pressure which might be present in chamber 49 will flow through passage 39, chamber 175, past valve 172, into chamber 169 and thence through ports 170 in follower 168 to chamber 166 which is open to atmosphere by way of passage 167. In this manner any force which might be exerted on the left-hand end of the beam 41, as viewed in Fig. 1 of the drawings, by reason of fluid under pressure in chamber 49 is dissipated.

When the pressure of fluid supplied to chamber 145 in the brake cylinder cut-off valve device 35 is increased to a degree, such as 10 pounds, sufficient to overcome the opposing force of spring 153, the diaphragm 144 will deflect inwardly. It will be understood that the strength of spring 156 is of a higher value than that of spring 162. Consequently, the initial inward deflection of diaphragm 144 will cause supply valve 158 to be moved to its seated position first in which communication between chambers 160 and 157, and therefore between pressure chamber 20 in the brake cylinder device 6 and chamber 33 in the relay valve device 8, is cut off.

Upon an increase in the pressure of fluid supplied to chamber 145 to a predetermined higher degree, such as 12 pounds, sufficient to overcome the additional opposing force of spring 156, diaphragm 144 will be deflected further inward, causing the valve seat 155 to move away from the exhaust valve 154. With valve 154 unseated any fluid under pressure which may be present in pilot chamber 33 will flow through passage 34, chamber 157, chamber 151 and ports 152 in the follower 150 to chamber 148 and thence by way of vent passage 149 to atmosphere. In this manner any force which might be exerted on the right-hand end of the beam 41, as viewed in Fig. 1 of the drawings, by reason of fluid pressure in chamber 33 is dissipated.

When the pressure of fluid supplied to the latch diaphragm chamber 88 is increased to a degree, such as 15 pounds, sufficient to overcome the opposing force of spring 86, the diaphragm 87 will deflect against said spring to actuate the plunger 96 into contact with the bottom surface of the check valve 93. This distance of deflection will be sufficient to draw the latch 84 out of locking engagement with the teeth 83 on the piston stem 74, following which the plunger 96 will unseat the check valve 93 against the additional opposing force of the spring 97. Fluid under pressure supplied from the cut-off valve chamber 192 to the check valve chamber 94 will then flow to chamber 95 and thence through passage 103 to the adjusting piston chamber 102 and to bias piston chamber 78. Fluid under pressure thus provided on the bias piston 77 will promptly move said piston to the position in which it is shown in the drawing, if it is not already in said position, for thereby actuating the fulcrum 64 to its empty position, in which it is also shown in the drawing.

When the pressure of fluid in chamber 102 acting on the adjusting piston 99 is increased to a degree sufficient to overcome the opposing force of spring 104, said piston will move against said spring and thereby rock the bell crank like lever 114 in a clockwise direction about pin 115 and, through the medium of the cam surface 117, the levers 119 and 128 will be rocked in a counterclockwise direction and pull the connecting rod 130 in the direction of the right hand. This movement of the connecting rod 130 causes the bell crank lever 133 to rock about the pin 134 which will in turn draw the surface 140 of the measuring element 139 into contact with the unsprung part 141 of the car truck, which will prevent further movement of the piston 99 by pressure of fluid in chamber 102.

When the equipment is devoid of fluid under pressure, as well as after an adjusting operation such as being described, the measuring element 139 will occupy the position with respect to the unsprung part 141 of the car truck in which it is shown in the drawing when the car is empty, so that during adjustment movement piston 99 will be stopped by contact between said element and the unsprung part 141 when the surface 111 on the adjusting piston rod 100 just contacts the adjacent end of lever 107 with the other end of said lever just in contact with the adjacent end of the bias piston rod 74 and with the bias piston 77 and fulcrum 64 in empty position above described and shown in the drawing. Furthermore, with the car empty, the roller 118 carried on the end of lever 119 will move just to the junction of the fixed cam surface 117 on the bell crank lever 114 and the adjustable cam surface 123 on the adjustable element 122 when the measuring element 139 contacts the unsprung truck part 141.

If the car is fully loaded, the body thereof will occupy a position closer to the unsprung part 141 of the truck than when the car is empty. In this fully loaded position the lower portion of the measuring element 139 may therefore initially occupy a position such as indicated by a dot and dash line 214 in the drawing and therefore require a greater movement before it comes into contact with the unsprung part 141 to thus permit a greater movement of the adjusting piston 99 by pressure of fluid in chamber 102 than when the car is empty. The adjustable cam 122 will therefore become effective to operate levers 119 and 133 during this greater movement and said cam will be so adjusted by regulating screw 126 as to permit sufficient movement of piston 99 to actuate lever 107 to move the bias piston rod 74 and piston 77 against pressure of fluid in chamber 78 to a position in which piston 77 is in substantial contact with the right-hand end wall of chamber 78 and in which the fulcrum 64 will therefore occupy its full-loaded position substantially under the end of the diaphragm follower stem 40.

For various degrees of load on a car between empty and full load the car body will assume corresponding positions with respect to the unsprung part 141 of the car, and as a result, the measuring element 139 and the fulcrum 64, as actuated by the adjusting piston 99, will likewise assume corresponding positions between the empty and full load positions thereof, as will be clear from the above description.

The cam 123 is adjustable in accordance with the amount of deflection of the car body supporting springs (not shown) between the empty and fully loaded conditions thereof in order to obtain the desired positioning of fulcrum 64 for the empty and fully loaded conditions of the car, regardless of variations in the deflection and characteristics of said spring such as encountered on different cars, as fully described in Patent No. 2,482,246, issued to Cook et al. on September 20, 1949.

While the fulcrum 64 of the load compensating valve device 6 is being adjusted to a position corresponding to the empty or load condition of the car as just described, the pressure of fluid in diaphragm chamber 190 of the cut-off valve portion 146 continues to increase with the increase in the diaphragm chamber 192 and brake pipe 2. This increase in pressure in chamber 190 acts to gradually deflect diaphragm 182 toward the right hand to correspondingly increase the pressure of spring 187 against that of diaphragm 183 so as to offset the increase of pressure of fluid in chamber 192 acting on diaphragm 183 and to thus hold the latter diaphragm and slide valve 198 in their cut-in position in which they are shown in the drawing. Eventually the pressure of fluid in diaphragm chamber 190 will become increased to a degree at which deflection of diaphragm 182 will be stopped by contact of the diaphragm follower 188 with the casing, thereby limiting to a certain selected degree the increase in pressure of spring 187 against diaphragm 183. Then when the pressure of fluid in the brake pipe 2 and in valve chamber 192 becomes increased to a certain higher degree, such as 40 pounds, which is sufficient to overcome the opposing increased pressure of the spring 187, the diaphragm 183 will be deflected toward the left hand to a position defined by contact between the diaphragm follower 189 and the casing for thereby shifting the slide valve 198 to its cut-out position.

In the cut-out position of the slide valve 198 the port 215 therein connects passage 147 to the atmospheric passage 202 whereupon fluid under pressure is vented from the diaphragm chamber 88 and from chambers 145 and 165 in the brake cylinder cut-off valve 35 and the compensating cylinder cut-off valve 37, respectively, and diaphragm chamber 190 to atmosphere. The venting of fluid under pressure from the latter chamber permits the diaphragm 182 to be returned to the position defined by contact with the left-hand end wall of chamber 190 by spring 187, which reduces the force of said spring on the diaphragm 183 to a degree which will prevent return of the latter diaphragm and of the slide valve 198 to their cut-in position until the brake pipe pressure effective in valve chamber 192 is subsequently reduced to a degree less than a relatively low degree, thereby insuring that the cut-out slide valve 198 will remain in its cut-out position, so as to maintain the fulcrum 64 in its adjusted position, during all normal operation of the brakes on the car while connected in a train.

The venting of fluid under pressure from the diaphragm chamber 88 upon movement of the cut-out valve 198 to its cut-out position permits spring 91 to return diaphragm 87 to the position in which it is shown in the drawing. This operation actuates plunger 95 out of engagement with check valve 93 and into locking engagement with the bias piston rod 74. The check valve 93 will then be seated by the spring 97.

At the same time as fluid under pressure is being released from passage 147 by way of port 215, passage 216 in slide valve 198 connects passages 103 and 204 to the atmospheric passage 202 by way of the choke connection 217. The timing reservoir 205 previously charged with fluid under pressure from the brake pipe, is thus placed in communication with the adjusting piston chamber 102 and bias piston chamber 78, and said reservoir and these chambers are all open to atmosphere through the restricted connection 217, whereby the pressure of fluid in said reservoir and chambers will be gradually reduced at a rate determined by the flow capacity of said connection relative to the volume of said reservoir and chambers.

The volume of the timing reservoir 205 with respect to the flow capacity of the choke connection 217 and the combined volume of chambers 78 and 102 is such as to maintain sufficient pressure in chamber 78 on the bias piston 77 and in chamber 102 on the bias piston 99 to firmly hold the bias piston rod 74 against lever 107 and the measuring element 139 in contact with the unsprung part 141 of the truck until after the locking plunger 84 is moved into locking engagement with the bias piston rod 73, following which, the pressure of fluid in said reservoirs and chamber will continue to reduce to atmospheric pressure. When the pressure of fluid in the adjusting piston chamber 102 is thus sufficiently reduced, spring 104 will return the adjusting piston 99 to the position in which it is shown on the drawing, but the bias piston 77, and thereby the fulcrum 64, will be maintained in the position to which they are adjusted through the locking action of plunger 84. When the adjusting piston 99 is returned to the position in which it is shown on the drawing, bias spring 143 acting on the rod 136 will move said rod downwardly for moving the surface 149 of the measuring element 139 out of contact with the unsprung part 141 of the truck back to the position in which it is shown in the drawing, and during such movement the bell crank 133, connecting rod 130 and thereby levers 128 and 119 will also be actuated by said spring to return the roller 118 to the position in which it also is shown on the drawing. With the measuring element 139 moved downwardly out of contact with the unsprung part 141 of the truck, the contact therebetween will be avoided during operation of the car in a train around curves, over humps and etc., to prevent damage to these parts.

The venting of fluid under pressure from chamber 145 of the brake cylinder cut-off valve device 35 to a certain pressure, such as 12 pounds, upon movement of the cut-out valve 198 to its cut-out position permits spring 153 to return diaphragm 144 and follower 150 to the position in which they are shown in the drawing. This action permits spring 156 to seat the exhaust valve 154, thereby closing the connection of pilot chamber 33 to atmosphere, and also permits spring 162 to unseat supply valve 158, thereby connecting brake cylinder pipe 11 to pilot chamber 33 and thus preparing for normal brake release and application of the equipment.

The venting of fluid under pressure from chamber 165 of compensating cylinder cut-out valve device 37 to a certain pressure, such as 8 pounds, upon movement of the cut-out slide valve 198 to its cut-out position permits spring 171 to return diaphragm 164 and follower 168 to the position in which they are shown on the drawing. This action permits spring 171a to seat exhaust valve 172 thus closing communication between atmospheric chamber 166 and chamber 177 leading by way of passages 38 and 39 to balancing chamber 49, and spring 180 to unseat supply valve 176, thus connecting chamber 175 to chamber 178 leading by way of passage 179 to compensating cylinder pipe 27 and thus preparing for a normal brake release or brake application operation of the equipment.

With the equipment conditioned for operation, and brake pipe 2 fully charged to normal pressure, if either a service or an emergency reduction in pressure in said brake pipe is effected, brake controlling valve device 1 will operate to supply fluid under pressure from either the auxiliary reservoir 3, or from both the auxiliary reservoir 3 and the emergency reservoir 4, respectively, to the brake cylinder pipe 11 and thence to the main pressure chamber 18 in the brake cylinder device 6, in the usual well known manner. Fluid under pressure thus supplied to the brake cylinder pipe 11 will flow through passage 161 and past the open supply valve 158 in the brake cylinder cut-off valve device 35 to the pilot diaphragm chamber 33 in the load compensating valve device 8.

Let it be assumed that the fulcrum 64 is in empty position in which it is shown on the drawing. The pressure of fluid in the pilot diaphragm chamber 33 will then deflect the diaphragm 31 downward and rock the beam 41 about the rockable connection with fulcrum 64 and thereby act through stem 44 to move the diaphragm 32 and nut 46 in an upward direction into contact with the release valve 53 and then actuate said valve to open the supply valve 59. Upon opening the supply valve 59 fluid under pressure from the load reservoir 7 will flow through pipe 62, passage 61 and the supply valve chamber 60 to chamber 49 and thence through passage 39 to chamber 175 in the compensating cylinder cut-off valve device 37, then past valve 172 to chamber 178, whence it flows through passage 179 and pipe 27 to the compensating pressure chamber 24 in the brake cylinder device 6. At the same time fluid under pressure will flow from chamber 49 through a choke 38 to chamber 36 at the upper side of diaphragm 32. Choke 38 is merely a stabilizing choke and its purpose is to prevent the pressure in diaphragm chamber 36 from increasing more rapidly than that in the pressure chamber 24 of the brake cylinder device 6.

Fluid under pressure will thus continue to be supplied to the compensating pressure chamber 24 in the brake cylinder device 6 and the diaphragm chamber 36 until such pressure acting on diaphragm 32, which acts on one end of the beam 41, is increased to a degree sufficient to overbalance the pilot pressure in chamber 33 acting on diaphragm 31 plus the pressure of spring 209, whereupon diaphragm 32 will be deflected downwardly to permit closing of the supply valve 59 by spring 63 for preventing further flow of fluid under pressure to compensating pressure chamber 24 in the brake cylinder device 6. When the supply valve 59 is closed, as just mentioned, there will be no further flow of fluid under pressure to and consequent increase in pressure of fluid in diaphragm chamber 36 whereupon deflection of diaphragm 32 will cease in a lap position in which the fluid pressure release valve 53 is still seated with the fulcrum 64 in the empty position, substantially midway between the diaphragm stems 40a and 44. The pressure of fluid obtained in the compensating pressure chamber 24 of the brake cylinder device 6 will therefore be limited to a degree slightly greater than the pressure of fluid in the main brake cylinder pressure chamber 18 as determined mainly by the pressure of spring 209 on diaphragm 32.

The pressure of fluid thus provided in the compensating pressure chamber 24 of the brake cylinder device 6 acts over the area of the brake cylinder piston 17 outside of the hollow stem 21, and the force thus created is less than that due to pressure of fluid in the main pressure chamber 18 acting over the full area of said piston, so that said piston will be forced in the direction of the right hand against the release spring 30 to apply the brakes to a degree equal to the differential between these forces, as required to provide the desired braking of an empty car.

It should be noted that a certain degree of fluid pressure, such as 10 pounds, must be developed in the pilot diaphragm chamber 33 in order to overcome the opposing pressure spring 209 and become effective to actuate the scale beam 41, thereby preventing or delaying the development of fluid pressure in the compensating chamber of the brake cylinder device 6 until pressure has developed in the pressure chamber 18. The purpose of this is to prevent the possible occurrence of a development of a fluid pressure in compensating cylinder 24 prior to development of fluid pressure in pressure chamber 18 and thereby prevent the possibility of blowing the packing cup 20 off of or away from the piston head 19 of the piston 17.

Now assume that the fulcrum 64 is adjusted midway between its empty and full load positions, for example, for a car half loaded, fluid will be provided in a compensating pressure chamber 24 in the brake cylinder device 6, and thereby in diaphragm chamber 36 in the compensating device 8, until the pressure thereof minus that of spring 209 is able to over-balance the pressure in the pilot diaphragm chamber 33 so as to permit closing of its supply valve 59, whereby the brakes on the car will be applied by a force, equal to the pressure of fluid in chamber 18 acting on the full area of piston 17 less the opposing pressure of fluid in the compensating pressure chamber 24 acting on a smaller area of said piston, which opposing pressure is proportional to the semi-loaded condition of the car, whereby the braking power delivered by the brake cylinder device 6 for braking the car will be proportional to the semi-loaded condition thereof. It will be apparent that for any other adjustment of the fulcrum 64 between its empty and full load positions the pressure of fluid in the compensating pressure chamber 24 of the brake cylinder device 6 will be correspondingly limited so as to provide a braking force for the car proportional to the degree of load on the car.

In case an emergency reduction in pressure in the brake pipe 2 is effected for obtaining an emergency application of the brakes, the pressure in said brake pipe and thereby in the cut-off valve chamber 192 of the cut-off valve device 146 will be reduced to atmospheric pressure, and when the pressure of fluid in said chamber becomes reduced to a degree below the opposing force of spring 187, said spring will actuate diaphragm 183 and the slide valve 198 back to their cut-in position, in which they are shown on the drawing. The pressure of fluid against which spring 187 can thus return the cut-off slide valve 198 to its cut-in position is however, lower (for instance 8 pounds) than that required in the latch diaphragm chamber 88 for actuating the diaphragm 87 for moving latch 84 out of locking engagement with the bias piston rod 74, so that the position of the fulcrum 64 will not change under such a condition.

In applying the car brakes, as above described, it will be noted that on a fully loaded car the spring 209 acts to hold the release valve 53 open to permit the pressure of fluid in pressure chamber 24 of the brake cylinder device 6 to remain at atmospheric pressure. When the car is less than fully loaded however, the spring 209 acts to delay opening of the supply valve 59 by fluid under pressure acting on the pilot diaphragm 31, and thus acts to correspondingly delay establishment of pressure of fluid in the compensating pressure chamber 24 of the brake cylinder device 6 until after a sufficient pressure of fluid is obtained in the main pressure chamber 18 to actuate the brake cylinder piston 17 to positively and promptly move the brake shoes on the car into frictional engagement with the car wheels, following which, pressure of fluid in said compensating chamber will increase substantially in unison with that in the main pressure chamber 18 for limiting the degree of braking on a car in accordance with the load carried thereby.

Upon an increase in pressure of fluid in brake pipe 2 for causing operation of the brake controlling valve device 1 to effect a release of fluid under pressure from the brake cylinder pipe 11 and thereby from the main pressure chamber 18 in the brake cylinder device 6 for releasing the brakes on a car, a corresponding reduction in pressure of fluid in pilot diaphragm chamber 33 will occur. As the pressure of fluid in chamber 33 is thus reduced the pressure of fluid in chamber 36, plus the pressure of spring 209, will deflect the diaphragm 32 and thereby rock the scale beam 41 about its fulcrum 64 for pulling the nut extension 48 out of engagement with the release valve 53. Upon opening of the release valve 53 fluid under pressure will be released from the compensating pressure chamber 24 in the brake cylinder device 6 with the release of fluid under pressure from the main pressure chamber 18. When the pressure of fluid in pressure chamber 18 of the brake cylinder device 6 is thus reduced sufficiently the brake cylinder release spring 30 will return piston 17 to its release position shown in the drawing, whereby the brakes on the car will be released.

It will of course be evident that when the fulcrum 64 is in full load position and no fluid pressure is provided in the brake cylinder compensating pressure chamber 24 in effecting an application of brakes, there will be no release of fluid therefrom in effecting a release of brakes, and therefore there will be no flow of fluid past the open release valve 53 into said chamber as the brake cylinder piston 17 is returned to its release position, it being noted that the open release valve 53 on a fully loaded car provides in effect a breather connection between the brake cylinder compensating pressure chamber 24 and atmosphere.

When the brakes of the car are released, the spring 209 acting on diaphragm 31 insures that the release valve 53 will remain open to dissipate to atmosphere any leakage of fluid that may occur past the supply valve 59, to thereby insure against such pressure becoming effective in the compensating pressure chamber 24 of the brake cylinder device 6 when not desired and which might interfere with a subsequent application of brakes.

When the car is set out on a siding for loading, or for unloading and reloading, the brake pipe 2 will be open to atmosphere and the brake cylinder device 6 will be operated to apply the brakes on a car in the same manner as above described and to a degree corresponding to the empty or loaded condition thereof. When the car is again picked up and placed in a train the compensating valve device 8 will again operate in response to charging of the brake pipe 2 to adjust, or readjust if necessary, the position of the fulcrum 64 in accordance with the empty or loaded condition thereof in the same manner as hereinbefore described, whereby during operation of the car in a train the degree of braking of the car will again be limited in accordance with the empty or loaded condition thereof.

*Description—Fig. 3*

In the structure disclosed in Fig. 1, it will be noted that during charging of the brake pipe 2 and prior to movement of the cut-off valve device 146 to its cut-off position in response to increase in pressure in the brake pipe to 40 pounds, the pilot diaphragm chamber 33 was disconnected from the brake cylinder pressure chamber 18 and vented by operation of the brake cylinder cut-off valve device 35 while chambers 36 and 49 above the balancing diaphragm 32 were disconnected from the brake cylinder compensating pressure chamber 24 and vented by operation of the compensating cylinder cut-off valve device 37, whereby both ends of the beam 41 were relieved of force during adjustment of fulcrum 64 while the brakes were applied in order to facilitate accurate adjustment of said fulcrum and minimize wear between said fulcrum and beam. The same result of unloading beam 41 during adjustment of fulcrum 41 may also be accomplished by the more simple structure shown in Fig. 3 of the drawings.

The structure shown in Fig. 3 differs from that shown in Fig. 1, for purpose of illustration, only in that it does not embody the compensating cylinder cut-off valve device 37 whereby the balancing chambers 36, 49 are in permanent communication with pipe 27 and thence with the compensating brake cylinder pressure chamber 24. Thus upon charging the brake pipe 2 to effect a release of brakes following the car having been set out on a siding for loading or removal of a load the pilot diaphragm chamber 33 will be vented by operation of the brake cylinder cut-off valve device 35 as above described in connection with Fig. 1 whereupon the beam 41 will assume its release position to open the release valve 53 and vent the fluid under pressure from the balancing chambers 36, 39 and compensating brake cylinder pressure chamber 24. Both ends of the beam 41 will thereby be unloaded to permit ready adjustment of the fulcrum 64 in the same manner as in the structure shown in Fig. 1. Otherwise operation of the structure shown in Fig. 3 is the same as that shown in Fig. 1, the same reference numerals being applied to corresponding parts in both structures to facilitate an understanding.

*Summary*

It will now be seen that I have provided a valve means for load compensating brake apparatus having a relay valve device of the scale beam type with a shiftable fulcrum, which means operates to relieve the scale beam of the balancing forces during the load adjusting operation whereby a simple knife edge may be employed as a fulcrum.

Having now described the invention, what we claim as new and desire to secure by Letters Patent, is:

1. In a variable load brake equipment, in combination, a brake pipe, brake controlling means operative upon a reduction in pressure of fluid in said brake pipe to effect an application of the brakes on the vehicle, a load compensating mechanism for limiting the degree of said application in accordance with the degree of load carried by said vehicle, said mechanism comprising a scale beam for balancing a pilot pressure against another pressure for limiting the degree of said application in accordance with the degree of load carried by said vehicle, a fulcrum rockably supporting said scale beam and shiftable to various positions relative thereto, motor means operable in response to a certain degree of pressure of fluid to shift said fulcrum relative to said scale beam according to the load carried by the vehicle, and valve means responsive to a predetermined degree of fluid pressure lower than said certain degree to reduce the pressures balancing on said scale beam to atmosphere.

2. In a variable load brake equipment, in combination, a brake pipe, brake controlling means operative upon a reduction in pressure of fluid in said brake pipe to effect an application of the brakes on said vehicle, a load compensating mechanism for limiting the degree of said application in accordance with the degree of load carried by said vehicle, said mechanism comprising a scale beam for balancing a pilot pressure against another pressure for limiting said application, a fulcrum rockably supporting said scale beam and shiftable to various positions relative thereto, motor means operable in response to a certain degree of fluid pressure in said brake pipe to shift said fulcrum relative to said scale beam according to the load carried by the vehicle, and valve means responsive to a predetermined degree of fluid pressure in said brake pipe lower than said certain degree to reduce the pressures balancing on said scale beam to atmosphere.

3. In a variable load brake equipment for a vehicle having a sprung part and an unsprung part, a brake pipe, a brake cylinder device comprising a casing and a piston therein dividing said casing into a main pressure chamber at one side of said piston and a compensating chamber at the opposite side and operative to provide a braking force on said vehicle equal to the difference in effect of fluid pressure in said chambers on said piston, brake controlling means operative upon a reduction in brake pipe pressure to supply fluid under pressure to said main chamber, a compensating device comprising an adjustable fulcrum and a scale beam supported and operative on said fulcrum and subject opposingly to pressures of fluid in said chambers for varying the pressure of fluid in said compensating chamber in accordance with the adjustment of said fulcrum and the degree of pressure of fluid in said main chamber, adjusting means operable in response to a certain degree of fluid pressure to adjust said fulcrum relative to said lever in accordance with the position of said sprung part with respect to said unsprung part, and valve means operable in response to a degree of fluid pressure lower than said certain degree to cut off the connections of said chambers with said compensating device and to reduce the fluid pressure acting on said scale beam to atmosphere.

4. In a variable load brake equipment for a vehicle having a sprung part and an unsprung part, a brake pipe, a brake cylinder device comprising a casing with a piston therein dividing said casing into a main pressure chamber at one side of said piston and a compensating chamber at the opposite side and operative to provide a braking force on said vehicle equal to the difference in effect of fluid pressure in said chambers on said piston, brake controlling means operative upon a reduction in brake pipe pressure to supply fluid under pressure to said main chamber and upon an increase in pressure in said brake pipe to release fluid under pressure from said main chamber, a compensating device comprising an adjustable fulcrum and a scale beam supported and operative on said fulcrum and subject opposingly to pressures of fluid in said chambers for varying pressure of fluid in said compensating chamber in accordance with the adjustment of said fulcrum and the degree of pressure of fluid in said main chamber, adjusting means operable in response to a certain degree of fluid under pressure to adjust said fulcrum relative to said lever in accordance with the position of said sprung part with respect to said unsprung part, and valve means operable in response to a degree of fluid pressure lower than said certain degree to cut off the connection of said main chamber with said compensating device and to reduce the fluid pressure previously supplied to said compensating device to atmosphere.

5. In a variable load brake equipment, in combination, a brake pipe, a brake cylinder device comprising a casing and a piston therein dividing said casing into a main pressure chamber at one side of said piston and a compensating chamber at the opposite side and operative to provide a braking force on said vehicle equal to the difference in effect of fluid pressures in said chambers on said piston, a compensating device comprising an adjustable fulcrum and a scale beam supported by and operative on said fulcrum and subject opposingly to pressure of fluid in a pilot chamber and the pressure of fluid in a balancing chamber for varying the pressure of fluid in said balancing chamber in accordance with the pressure of fluid in said pilot chamber and adjustment of said fulcrum, brake controlling means operative upon a reduction in brake pipe pressure to supply fluid under pressure to said main pressure chamber, adjusting means operative in response to a certain degree of fluid pressure to adjust said fulcrum relative to said scale beam in accordance with the load carried by the vehicle, and valve means having one position in which said main chamber is connected to said pilot chamber and said balancing chamber is connected to said compensating chamber and operative in response to a predetermined degree of fluid pressure lower than said certain degree to another position in which the mentioned chamber in the compensating device are cut off from the mentioned chambers in said brake cylinder device and connected to atmosphere.

6. In a variable load brake equipment, in combination, a brake pipe, a brake cylinder device comprising a casing and a piston therein dividing said casing into a main pressure chamber at one side of said piston and a compensating chamber at the opposite side and operative to provide a braking force on said vehicle equal to the difference in effect of fluid pressure in said chambers on said piston, a compensating device comprising an adjustable fulcrum and a scale beam supported by and operative on said fulcrum and subject opposingly to pressure of fluid in a pilot chamber and the pressure of fluid in a balancing chamber for varying the pressure of fluid in said balancing chamber in accordance with the pressure of fluid in said pilot chamber and the adjustment of said fulcrum, brake controlling means operative upon a reduction in brake pipe pressure to supply fluid under pressure to said main pressure chamber, adjusting means operative in response to a certain degree of fluid pressure to adjust said fulcrum relative to said scale beam in accordance with the load carried by the vehicle, and valve means having one position in which said main chamber is connected to said pilot chamber and operative in response to a predetermined degree of fluid pressure lower than said certain degree to another position in which said pilot chamber is cut off from the main pressure chamber and the pilot chamber is connected to atmosphere.

7. In a variable load brake equipment for a vehicle having a sprung part and an unsprung part, a brake pipe, a brake cylinder device comprising a casing and a piston therein dividing said casing into a main pressure chamber at one side of said piston from a compensating chamber at the opposite side and operative to provide a braking force on said vehicle equal to the difference in effect of fluid pressure in said chambers on said piston, brake controlling means operative upon a reduction in brake pipe pressure to supply fluid under pressure to said main chamber, a compensating device comprising an adjustable fulcrum and a scale beam supported and operative on said fulcrum and subject opposingly to pressures of fluid in a pilot chamber open to said main pressure chamber and a balancing chamber open to said compensating chamber for varying the pressure of fluid in said compensating chamber in accordance with the adjustment of said fulcrum and the pressure of fluid in said main chamber, adjusting means operable in response to a certain degree of fluid pressure in accordance with the position of said sprung part with respect to said unsprung part to correspondingly adjust said fulcrum relative to said lever, valve means operable in response to a degree of fluid pressure lower than said certain degree to cut off communication of said balancing chamber with said compensating chamber and to reduce fluid pressure in said balancing chamber to atmosphere, and valve means operative in response to a degree of pressure in a control chamber greater than said predetermined degree and less than said certain degree of pressure to cut off communication of said pilot chamber with said brake cylinder device and to reduce the pressure of fluid in said pilot chamber to atmosphere.

8. In a variable load brake equipment for a vehicle having a sprung part and an unsprung part, a brake pipe, a brake cylinder device comprising a casing and piston therein dividing said casing into a main pressure chamber at one side of said piston and a compensating chamber at the opposite side and operative to provide a braking force on said vehicle equal to the difference in effect of fluid pressure in said chambers on said piston, brake controlling means operative upon a reduction in brake pipe pressure to supply fluid under pressure to said main chamber, a compensating device comprising an adjustable fulcrum and a scale beam supported and operative on said fulcrum and subject opposingly to pressures of fluid in a pilot chamber open to said main pressure chamber and a balancing chamber open to said compensating chamber for varying the pressures of fluid in said compensating chamber in accordance with the adjustment of said fulcrum and the pressure of fluid in the said main chamber, adjusting means operable in response to a certain degree of pressure in accordance with the position of said sprung part with respect to said unsprung part to correspondingly adjust said fulcrum relative to said beam, and valve means interposed between said compensating device and said brake cylinder device for controlling communication between said main pressure chamber and said pilot chamber and between said compensating chamber and said balancing chamber, said valve means being operative in response to a predetermined zone of fluid pressure in one control chamber lower than said certain degree to cut off said compensating chamber from said balancing chamber and to vent said balancing chamber to atmosphere and operative in response to a zone of pressure in another control chamber greater than said predetermined zone and less than said certain degree of pressure to cut off said main pressure chamber from said pilot chamber and to vent said pilot chamber to atmosphere.

9. In a variable load brake equipment for a vehicle having a sprung part and an unsprung part, a brake pipe, a brake cylinder device comprising a casing and a piston therein dividing said casing into a main pressure chamber at one side of said piston and a compensating chamber at the opposite side of said piston and operative to provide a braking force on said vehicle equal to the difference in effect of fluid pressure in said chambers on said piston, brake controlling means operative upon a reduction in brake pipe pressure to supply fluid under pressure to said main chamber and upon an increase in pressure in said brake pipe to release fluid under pressure from said main chamber, a compensating valve device comprising an adjustable fulcrum and a scale beam supported and operative on said fulcrum and subject opposingly to pressures of fluid in a pilot chamber open to said main pressure chamber and a balancing chamber open to said compensating chamber for varying the pressure of fluid in said compensating chamber in accordance with the adjustment of said fulcrum and the pressure of fluid in said main chamber, adjusting means operable in response to a certain degree of fluid pressure in accordance with the position of said sprung part with respect to said unsprung part to correspondingly adjust said fulcrum relative to said lever, and valve means operable in response to a degree of fluid pressure in a control chamber lower than said certain degree to cut off communication between said main pressure chamber and said pilot chamber and to reduce the fluid pressure in said pilot chamber to atmosphere.

10. In a variable load brake equipment, in combination, a brake pipe, a brake cylinder device comprising a casing and a piston therein dividing said casing into a main pressure chamber at one side of said piston and a compensating chamber at the opposite side and operative to provide a braking force on said vehicle equal to the difference in effect of fluid pressure in said chambers on said piston, brake controlling means operative upon a reduction in brake pipe pressure to supply fluid pressure to said main chamber and upon an increase in pressure of said brake pipe to release fluid under pressure from said main chamber, a load compensating mechanism for varying the pressure of fluid in said compensating chamber in accordance with the adjustment of said fulcrum and the pressure of fluid in said main chamber, said mechanism comprising a scale beam subject opposingly to fluid pressures in a pilot chamber and a balancing chamber connected to said compensating chamber and also a fulcrum for rockably supporting said scale beam and shiftable to various positions relative thereto, motor means operative in response to a certain degree of fluid pressure in said brake pipe to shift said fulcrum relative to said scale beam according to the load carried by the vehicle, and valve means establishing communication between said main chamber and said pilot chamber and operative upon an increase of pressure in said brake pipe to a degree less than said certain degree to cut off said pilot chamber from said main chamber and to open said pilot chamber to atmosphere.

11. In a variable load brake equipment, in combination, a brake pipe, a brake cylinder device comprising a casing and a piston therein dividing said casing into a main pressure chamber at one side of said piston and a compensating chamber at the opposite side and operative to provide a braking force on said vehicle equal to the difference in effect of fluid pressure in said chambers acting said piston, brake controlling means operative upon a reduction in brake pipe pressure to supply fluid under pressure to said main chamber and upon an increase in pressure in said brake pipe to release fluid under pressure from said main chamber, a load compensating mechanism for limiting the degree of said application in accordance with the degree of load carried by said vehicle, said load compensating mechanism comprising an adjustable fulcrum and a scale beam rockably supported on said fulcrum subject opposingly to pressure of fluid supplied from said main chamber to a pilot chamber at one end of said scale beam and pressure of fluid in a balancing chamber at the other end of said scale beam for varying the pressure of fluid supplied to said compensating chamber in accordance with the adjustment of said fulcrum and the pressure of fluid in said pilot chamber and main chamber, adjusting means operable in response to a certain degree of fluid pressure in said brake pipe to shift said fulcrum relative to said scale beam according to the load carried by the vehicle, and valve means establishing communications between said main chamber and said pilot chamber and between said compensating chamber and said balancing chamber responsive to fluid at a pressure below said certain degree to cut off said communication and to open said pilot chamber and said balancing chamber to atmosphere.

12. In a variable load brake equipment, in combination, a brake pipe, comprising a casing and a piston therein dividing said casing into a main pressure chamber at one side of said piston and a compensating chamber at the other side and operative to provide a braking force on said vehicle equal to the difference in effect of fluid pressure in said chambers on said piston, brake controlling means operative upon a reduction in brake pipe pressure to supply fluid under pressure to said main chamber and upon an increase in pressure in said brake pipe to release fluid under pressure from said main chamber, a load compensating mechanism comprising an adjustable fulcrum and a scale beam rockably supported on said fulcrum and subject opposingly to pressure of fluid supplied from said main chamber to a pilot chamber at one end of said scale beam and pressure of fluid in a balancing chamber at the other end for varying the pressure of fluid in said compensating chamber in accordance with the adjustment of said fulcrum and the pressure of fluid in said pilot chamber and main chamber, adjusting means operable in response to a certain degree of fluid pressure in said brake pipe to shift said fulcrum relative to said scale beam according to the load carried by the vehicle, valve means establishing communication between said compensating chamber and said balancing chamber responsive to a predetermined degree of pressure less than said certain degree of pressure to cut off said communication and to connect said balancing chamber to atmosphere, and valve means establishing communication between said main chamber and said pilot chamber responsive to a degree of fluid pressure below said certain degree of pressure and above said predetermined degree of pressure to cut off said communication between said pilot chamber and said main chamber and to open said pilot chamber to atmosphere.

13. In a fluid pressure brake equipment, in combination, a brake pipe, first and second brake cylinder pipes, brake controlling means operable upon a reduction in pressure in said brake pipe to supply fluid under pressure to said first brake cylinder pipe and upon an increase in pressure of fluid in said brake pipe to release fluid under pressure from said first brake cylinder pipe, a relay comprising a lever, an adjustable fulcrum and two movable abutments of equal areas subject respectively and opposingly to pressures of fluid in said first and said second brake cylinder pipes and connected to said lever, valve means controlled by rocking of said lever for varying pressure of fluid in said second brake cylinder pipe according to variations in pressure in said first brake cylinder pipe, motor means operatble in response to a certain degree of fluid pressure to adjust said fulcrum relative to said lever according to the load carried by the vehicle, latch means for holding said fulcrum in an adjusted position and adapted to be rendered ineffective upon supply of fluid at a predetermined degree of pressure less than said certain degree to a control chamber, and valve means operable upon a supply of fluid at a degree of pressure less than said predetermined degree to cut off said brake cylinder pipes from said movable abutments and to connect said movable abutments to atmosphere.

14. In a fluid pressure brake equipment, in combination, a brake pipe, first and second brake cylinder pipes, brake controlling means operable upon a reduction in pressure in said brake pipe to supply fluid under pressure to said first brake cylinder pipe and upon an increase of pressure of fluid in said brake pipe to release fluid under pressure from said first brake cylinder pipe, a relay comprising a lever, an adjustable fulcrum and two movable abutments of equal area subject, respectively, and opposingly to pressure of fluid in said first and second brake cylinder pipes and connected to said lever, valve means controlled by rocking of said lever for varying pressure of fluid in said second brake cylinder pipe according to variations in pressure in said first brake cylinder pipe, motor means operable in response to a certain degree of fluid pressure to adjust said fulcrum relative to said lever according to the load carried by the vehicle, latch means for holding said fulcrum in an adjusted position and adaptable to be rendered ineffective upon a supply of fluid at a predetermined degree of pressure less than said certain degree to a control chamber, valve means operable upon a supply of fluid to a control chamber at a selected degree of pressure less than said predetermined degree to cut off the second brake cylinder pipe from its respective movable abutment and to connect said respective movable abutment to atmosphere, and valve means operable upon a supply of fluid at a degree of pressure less than said selected degree to cut off said first brake cylinder pipe to the other abutment and to connect said other abutment to atmosphere.

15. In a fluid pressure brake equipment, in combination, a brake pipe, first and second brake cylinder pipes, brake controlling means operable upon a reduction in pressure in said brake pipe to supply fluid under pressure to said first brake cylinder pipe and upon an increase of pressure of fluid in said brake pipe to release fluid under pressure from said first brake cylinder pipe, a relay comprising a lever, an adjustable fulcrum and two movable abutments of equal areas subject, respectively, and opposingly to pressure of fluid in said first and second brake cylinder pipes and connected to said lever, valve means controlled by rocking of said lever for varying pressure of fluid in said brake cylinder pipe according to variations in pressure in said first brake cylinder pipe and the adjustment of said fulcrum, motor means operable in response to a certain degree of fluid pressure to adjust said fulcrum relative to said lever according to the load carried by the vehicle, latch means for holding said fulcrum in an adjusted position and adapted to be rendered ineffective upon supply of fluid at a predetermined degree of pressure less than said certain degree to a control chamber, and valve means operable upon a supply of fluid at a degree of pressure less than said predetermined degree to cut off said first brake cylinder pipe from its respective movable abutment and to connect said respective movable abutment to atmosphere.

16. In a fluid pressure brake equipment, in combination, a brake pipe, first and second brake cylinder pipes, brake controlling means operable upon a reduction in pressure in said brake pipe to supply fluid under pressure to said first brake cylinder pipe and upon an increase in pressure of fluid in said brake pipe to release fluid under pressure from said first brake cylinder pipe, a relay comprising a lever, an adjustable fulcrum and two movable abutments of equal areas subject respectively and opposingly to pressure of fluid in first and second brake cylinder pipes and connected to said lever, valve means controlled by rocking of said lever for varying the pressure of fluid in said brake cylinder pipe according to variations in pressure in said first brake cylinder pipe and the position of said fulcrum relative to said lever, motor means operable in response to a certain degree of fluid pressure to adjust said fulcrum relative to said lever according to the load carried by the vehicle, latch means for holding said fulcrum in an adjusted position and adapted to be rendered ineffective upon supply of fluid at a predetermined degree of pressure less than said certain degree to a control chamber, and valve means responsive to a supply of fluid and a degree of pressure less than said predetermined degree to reduce the pressures acting on said movable abutments to atmosphere.

17. In a variable load brake equipment, in combination, a brake pipe, brake controlling means operative upon a reduction in pressure of fluid in said brake pipe to effect an application of the brakes on said vehicle, a load compensating mechanism for limiting the degree of said application in accordance with the degree of load carried by said vehicle, said mechanism comprising a scale beam for balancing a pilot pressure against a pressure for limiting said application, a fulcrum for rockably supporting said scale beam and shiftable to various positions relative thereto, motor means operable in response to a certain degree of pressure of fluid to shift said fulcrum relative to said scale beam according to the load carried by the vehicle, valve means responsive to a predetermined degree of fluid pressure supplied to a control chamber lower than said certain degree to reduce the pressures balancing on said scale beam to atmosphere, and a cut-off valve device having a cut-in position in which fluid under pressure is supplied from said brake pipe to said valve means and said motor means and operative upon an increase in brake pipe pressure to a degree higher than said predetermined degree to a cut-off position in which the supply of fluid under pressure from said brake pipe is cut off and the control chambers in said valve means and said motor means are open to atmosphere.

18. In a variable load brake equipment, in combination, a brake pipe, brake controlling means operable upon a reduction in pressure of fluid in said brake pipe to effect an application of the brakes on said vehicle, a load compensating mechanism for limiting the degree of said application in accordance with the degree of load carried by said vehicle, said mechanism comprising a scale beam for balancing a pilot pressure against a pressure for limiting said application, a fulcrum for rockably supporting said scale beam and shiftable to various positions relative thereto, motor means operable in response to a certain degree of pressure of fluid in said brake pipe supplied to a control chamber to shift said fulcrum relative to said scale beam according to the load carried by the vehicle, valve means responsive to a predetermined degree of fluid pressure in said brake pipe supplied to a control chamber lower than said certain degree to reduce the pressures balancing on said scale beam to atmosphere, and a cut-off valve device having a cut-in position in which fluid under pressure is supplied from said brake pipe to said valve means and to said motor means and operative upon an increase in brake pipe pressure to a degree higher than said predetermined degree to a cut-off position in which the supply of fluid under pressure from said brake pipe to said valve means and to said motor means is cut off and the control chambers in said valve means and said motor means are open to atmosphere.

19. In a fluid pressure brake equipment, in combination, a brake pipe, first and second brake cylinder pipes, brake controlling means operable upon a reduction in pressure in said brake pipe to supply fluid under pressure to said first brake cylinder pipe and upon an increase in pressure of fluid in said brake pipe to release fluid under pressure from said first brake cylinder pipe, a relay valve device comprising a lever, an adjustable fulcrum and two movable abutments of equal areas subject, respectively, and opposingly to pressures of fluid in first and second brake cylinder pipes connected to said lever, valve means controlled by rocking of said lever for varying pressure of fluid in said second brake cylinder pipe according to variations in pressure in said first brake cylinder pipe and the position of said fulcrum relative to said lever, motor means operable in response to a certain degree of fluid pressure to adjust said fulcrum relative to said lever according to the load carried by the vehicle, latch means for holding said fulcrum in an adjusted position and adapted to be rendered ineffective upon supply of fluid at a predetermined degree of pressure less than said certain degree to a control chamber, valve means operable upon a supply of fluid at a selected degree of pressure less than said predetermined degree to a control chamber to cut off said second brake cylinder pipe from its respective movable abutment and connect said respective movable abutment to atmosphere, valve means operable upon a supply of fluid at a degree of pressure less than said selected degree to cut off said first brake cylinder pipe from the other abutment and connect said other abutment to atmosphere, cut-off valve device having a cut-in position in which fluid under pressure is supplied from said brake pipe to said valve means and said motor means and operative upon an increase in brake pipe pressure to a degree higher than said predetermined degree to a cut-off position in which the supply of fluid under pressure from said brake pipe is cut off from the control chambers in said valve means, and said latch means and said motor means are open to atmosphere.

20. In combination, a scale beam, a fulcrum for said beam adjustable relative to the length of said beam, operated means subject to pressure of fluid acting on said beam at one side of said fulcrum, fluid pressure operating means acting on said beam at the opposite side of said fulcrum, means for adjusting said fulcrum, control means for effecting operation of said fulcrum adjusting means, cut-off means having a normal position for rendering said operated and operating means subject to pressure of fluid and having a cut-off position for venting such fluid pressure, locking means for said fulcrum, and means responsive to fluid at less than a chosen degree to effect operation of said cut-off means to its cut-off position, to render said locking means ineffective and to effect operation of said control means, and responsive to fluid at a higher pressure to effect operation of said cut-off means to its normal position and to render said locking means effective.

EARLE S. COOK.
GLENN T. McCLURE.
JOHN W. RUSH.

REFERENCES CITED

The following references are of record in the file of this patent:

UNITED STATES PATENTS

| Number | Name | Date |
|---|---|---|
| 2,418,013 | Cook | Mar. 25, 1947 |